(12) United States Patent
Davis

(10) Patent No.: US 7,048,220 B2
(45) Date of Patent: *May 23, 2006

(54) STACKABLE ROTARY DEVICE MULTI-POSITION INDICATOR FOR PORTABLE DATA STORAGE CARTRIDGE

(75) Inventor: David Michael Davis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/337,721

(22) Filed: Jan. 8, 2003

(65) Prior Publication Data

US 2004/0129819 A1    Jul. 8, 2004

(51) Int. Cl.
*G11B 23/07* (2006.01)

(52) U.S. Cl. ............... 242/348; 242/357; 360/132

(58) Field of Classification Search ........... 242/344, 242/357, 348; 360/132
See application file for complete search history.

(56) References Cited

U.S. PATENT DOCUMENTS

| | | | |
|---|---|---|---|
| 3,755,641 A | 8/1973 | Rackman | 200/163 |
| 4,320,421 A | 3/1982 | Larson et al. | 360/60 |
| 4,399,481 A | 8/1983 | Loranger et al. | 360/132 |
| 4,679,101 A | 7/1987 | Tezuka | 360/60 |
| 4,814,923 A | 3/1989 | Kawada et al. | 360/132 |
| 4,844,378 A | 7/1989 | Oishi | 242/199 |
| 5,699,216 A | 12/1997 | Doty | 360/132 |
| 5,786,967 A | 7/1998 | Gerfast et al. | 360/132 |

FOREIGN PATENT DOCUMENTS

| | | |
|---|---|---|
| JP | 63-102086 | 5/1988 |
| JP | 4-247375 | 9/1992 |
| JP | 5-198136 | 8/1993 |
| JP | 6-243651 | 9/1994 |

OTHER PUBLICATIONS

"File Protect Device", IBM Technical Disclosure Bulletin, Feb. 1986, vol. 28, No. 9, p. 3752.

"File Protect Detent and Sleeve", Research Disclosure, Feb. 1985, No. 25038.

*Primary Examiner*—John Q. Nguyen
(74) *Attorney, Agent, or Firm*—John H. Holcombe (57) ABSTRACT

Stackable rotary devices form a multi-position mechanical indicator for a portable data storage cartridge. Each rotary device is a right cylindrical section, and is separately rotatable in a chamber of the cartridge. A peripheral surface of the rotary device has an encoded pattern of 1) at least one cylindrical surface and at least one facet interrupting the cylindrical surface, or of 2) readable indicia, located at various angularly spaced rotational positions. At differing rotational positions of the rotary devices, at least one or none of the facets or readable indicia are positioned at an exterior wall opening of the cartridge chamber.

14 Claims, 9 Drawing Sheets

STACKABLE ROTARY DEVICE MULTI-POSITION INDICATOR FOR PORTABLE DATA STORAGE CARTRIDGE

DOCUMENT INCORPORATED BY REFERENCE

Commonly assigned U.S. patent application Ser. No. 10/035,188, filed Jan. 4, 2002, now U.S. Pat. No. 6,744,595, is incorporated for its showing of an encoded multi-position mechanical indicator for portable data storage cartridges.

FIELD OF THE INVENTION

This invention relates to portable data storage cartridges, and, more particularly, to devices for providing an indication with respect to such portable data storage cartridges.

BACKGROUND OF THE INVENTION

Portable data storage cartridges provided convenient and low cost means for storing data. One example comprises automated data storage libraries which can contain large quantities of portable data storage cartridges on storage shelves, and employ robot accessors to access a cartridge when needed and deliver the cartridge to a data storage drive or transfer station.

In some instances, data, once recorded on a data storage medium of a portable data storage cartridge, is intended to be archived and left unchanged. Hence, a "write protect" device is placed in the cartridge which may be adjusted to indicate whether the data storage medium is write enabled and can be erased and written over, or whether the data storage medium is write protected and is not to be erased, as detected by a switch at the data storage drive which accepts the cartridge. Examples of two-position "on-off" write protect devices for magnetic tape media in which one position is the same as though no cartridge is present are illustrated in U.S. Pat. No. 4,320,421, Larson et al., U.S. Pat. No. 4,399,481, Loranger et al., U.S. Pat. No. 5,699,216, Doty, and U.S. Pat. No. 5,786,967, Gerfast et al. Gerfast et al. arranges the size of a recess and the write protect device such that separate switches of the data storage drive that are for detecting the presence of a cartridge may also be utilized with the write protect switch to write protect magnetic tape having a different coercivity from being written by an older tape drive, and to selectively write protect the tape in a newer tape drive. Thus, Gerfast et al. provides a same as though no cartridge is present.

The incorporated '188 U.S. patent application provides an encoded multi-position mechanical indicator for a portable data storage cartridge in which the indicator comprises a rotary device in the form of a right cylinder arranged to be rotatable in a chamber of a portable data storage cartridge, which has an exterior wall opening to the chamber. A peripheral surface of the rotary device has an encoded pattern of at least one cylindrical surface and a plurality of facets interrupting the cylindrical surface(s). The facets are located at various axial positions, and at various angularly spaced rotational positions, such that, at differing rotational positions of the rotary device, at least one or none of the facets is positioned at the exterior opening. This allows additional information rather than the simple binary "write-protect" to be encoded in the indicator.

The specific set of encoded information for each position of the indicator must be provided in advance and encoded into the indicator, e.g., as facets and cylindrical surfaces. As an example, the encoded pattern may be represented in binary terms, with the cylindrical surface comprising a "1" and activating a switch, and a facet comprising a "0" and not activating a switch. Thus, a three-sided encoded pattern, reading from top to bottom of the rotary device, respectively, might represent "0–1 ", "1–0" and "1—1". A fourth code of "0—0" would require adding a fourth side with both an upper facet and a lower facet positioned at the exterior wall opening of the portable data storage cartridge, or one of the other codes could be eliminated.

SUMMARY OF THE INVENTION

Stackable rotary devices form a multi-position mechanical indicator for a portable data storage cartridge.

In one aspect of the present invention, a stackable rotary device is in the general form of at least one right cylindrical section having a central axis of rotation, and is arranged to be rotatable in a chamber of the cartridge. The chamber is closely adjacent an exterior wall of the cartridge, with an opening extending through the exterior wall to the chamber.

In one embodiment, a peripheral surface of the rotary device right cylindrical section has an encoded pattern of at least one cylindrical surface and of at least one facet interrupting the cylindrical surface, the facets located at various angularly spaced rotational positions about the central axis of rotation.

In another embodiment, the rotary device has a peripheral surface of the right cylindrical section with an encoded pattern of readable indicia located at various angularly spaced rotational positions about the central axis of rotation.

Each rotary device is separately rotatable such that, at differing rotational positions of the rotary device, at least one or none of the facets or readable indicia is positioned at the exterior wall opening of the portable data storage cartridge; whereby, at least one or none of the facets or readable indicia of the plurality of stacked rotary devices are positioned at the exterior wall opening of the portable data storage cartridge.

In a further embodiment, at least one end of the right cylindrical section of the rotary device has a surface allowing rotational freedom of movement of the rotary device with respect to a stacked adjacent rotary device, such that the rotary device is separately rotatable with respect to the stacked adjacent rotary device.

In another embodiment, the rotary device comprises a thumb wheel for rotating the rotary device in the chamber of the cartridge, the thumb wheel comprising a cylindrical section of larger diameter than the peripheral surface.

In still another embodiment, the rotary device comprises a tab extending from the cylindrical section, substantially radially with respect to the central axis of rotation of the rotary device, for rotating the rotary device in the chamber of the cartridge.

In a further embodiment, the rotary device additionally comprises at least one rotary device retaining element for interacting with at least one matching retaining element of the cartridge to retain the rotary device in at least one of the rotary positions.

One example of a rotary device retaining element comprises a detent extending from the rotary device peripheral surface substantially radially with respect to the central axis of rotation of the rotary device, such that the detent may rest in at least one matching indentation in the chamber of the cartridge located peripherally to the rotary device.

Another example of a rotary device retaining element comprises at least one indentation substantially perpendicular to the central axis of rotation of the rotary device, such that a matching retaining element detent of the cartridge, which extends from the chamber of the cartridge, and is located peripherally to the rotary device, may rest in the at least one rotary device retaining element indentation.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
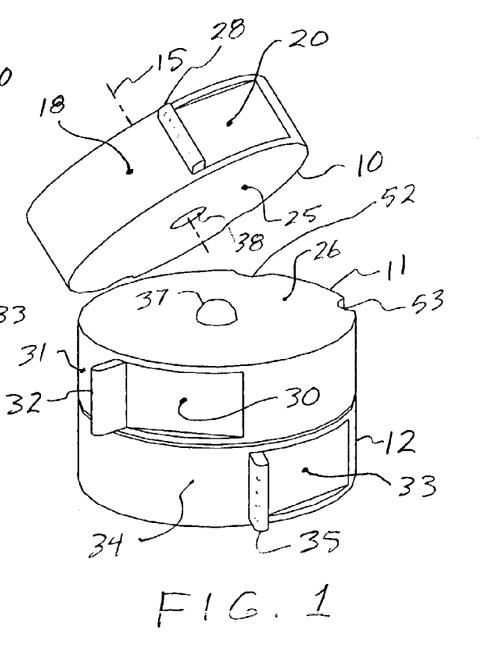
FIG. 1 is an isometric illustration of an embodiment of three stackable rotary devices in accordance with the present invention.
Figure 2:
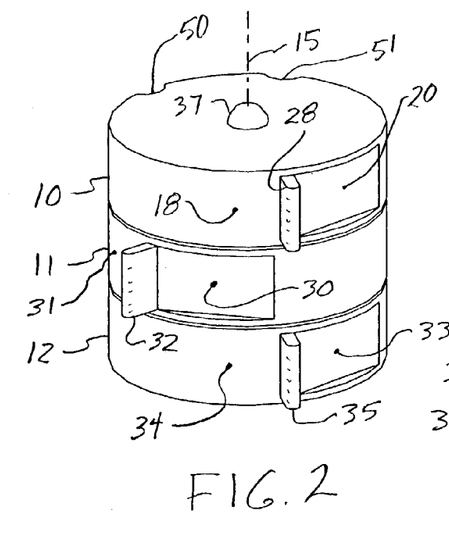
FIG. 2 is an isometric illustration of the rotary devices of FIG. 1, in a stacked arrangement.

FIGS. 1 and 2 illustrate three stackable rotary devices 10, 11 and 12 which form a multi-position mechanical indicator for a portable data storage cartridge.

In one aspect of the present invention, a stackable rotary device, e.g., rotary device 10, is in the general form of at least one right cylindrical section having a central axis of rotation 15, and is arranged to be rotatable in a chamber of the cartridge.

In one embodiment, as illustrated in FIGS. 1 and 2, a peripheral surface of the rotary device right cylindrical section has an encoded pattern of at least one cylindrical surface 18 and of at least one facet 20 interrupting the cylindrical surface, the facets located at various angularly spaced rotational positions about the central axis of rotation 15, in the present example, in a binary arrangement, one cylindrical surface 18 and one facet 20 are provided.

In a further embodiment, at least one end 25 of the right cylindrical section of the rotary device, e.g., rotary device 10, has a surface allowing rotational freedom of movement of the rotary device with respect to a similar surface 26 of a stacked adjacent rotary device, e.g., rotary device 11, such that the rotary device is separately rotatable with respect to the stacked adjacent rotary device.

In a still further embodiment, the rotary device, e.g., rotary device 10, comprises a tab 28 extending from the cylindrical section, substantially radially with respect to the central axis of rotation 15 of the rotary device, for rotating the rotary device in the chamber of the cartridge.

In the instant example, rotary device 11 comprises facet 30, cylindrical surface 31 and tab 32, and rotary device 12 comprises facet 33, cylindrical surface 34 and tab 35, each substantially similar to those of rotary device 10. Thus, tab 28 may be employed to rotate rotary device 10, tab 32 may be employed to rotate rotary device 11, and tab 35 may be employed to rotate rotary device 12. As pointed out by the incorporated U.S. patent application Ser. No. 10/035,188, a facet is defined as a flat or concave surface such that the radius of a facet from the central axis of rotation is substantially less than that of a cylindrical surface.

In addition, the rotary devices may comprise pins 37 which fit in corresponding holes 38 of adjacent rotary devices, all centered on the axis of rotation 15, and interact with corresponding pins and/or holes in the portable data storage cartridge to maintain the rotary devices substantially centered on the axis of rotation as they are rotated in the cartridge.

Figure 3:
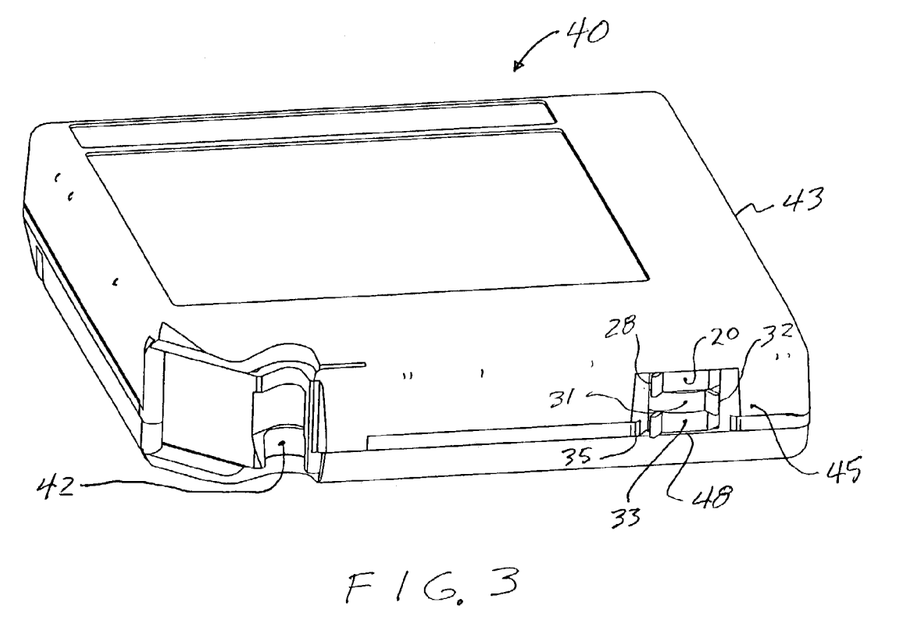
FIG. 3 is an isometric illustration of the rotary devices of FIG. 2 positioned in a portable data storage cartridge in accordance with one embodiment of the present invention.
Figure 4:
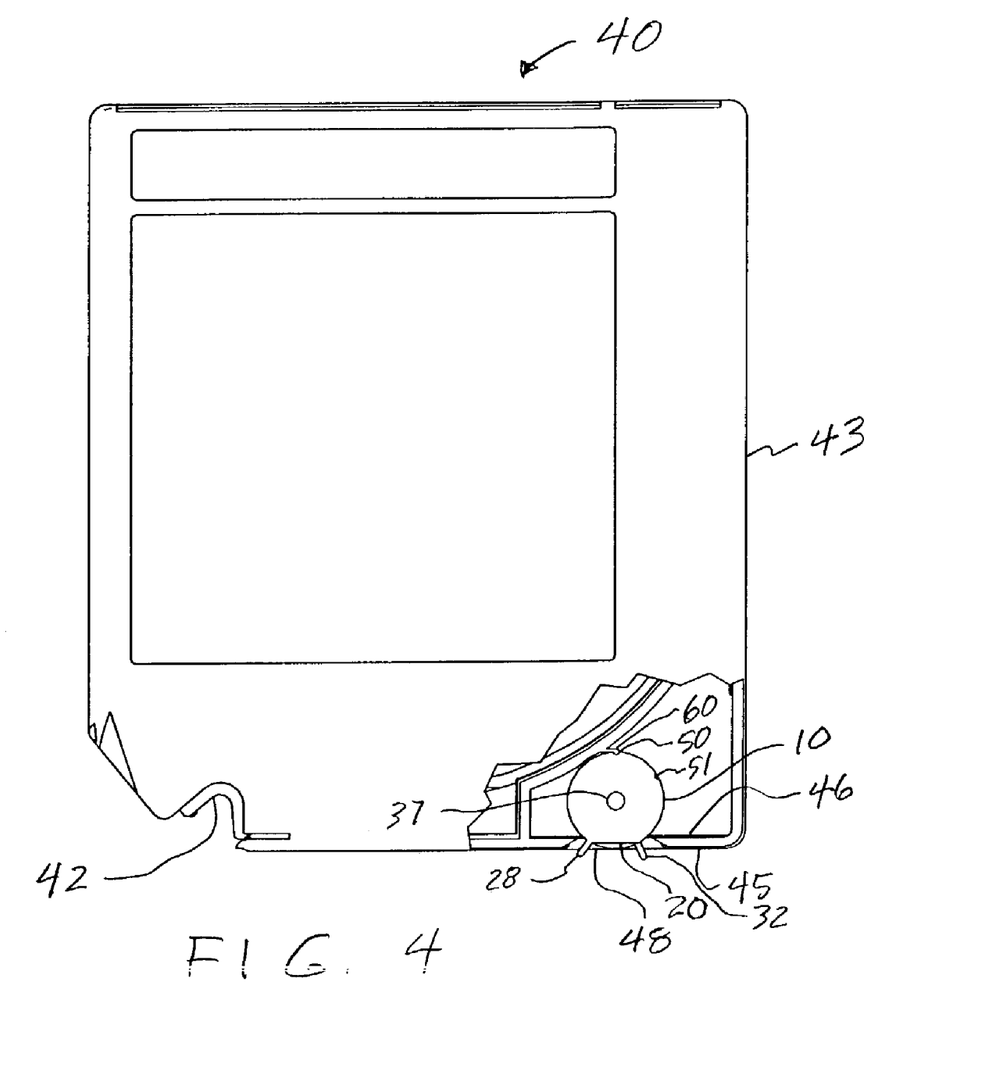
FIG. 4 is a partially cut away top view of the portable data storage cartridge of FIG. 3.
Figure 5:
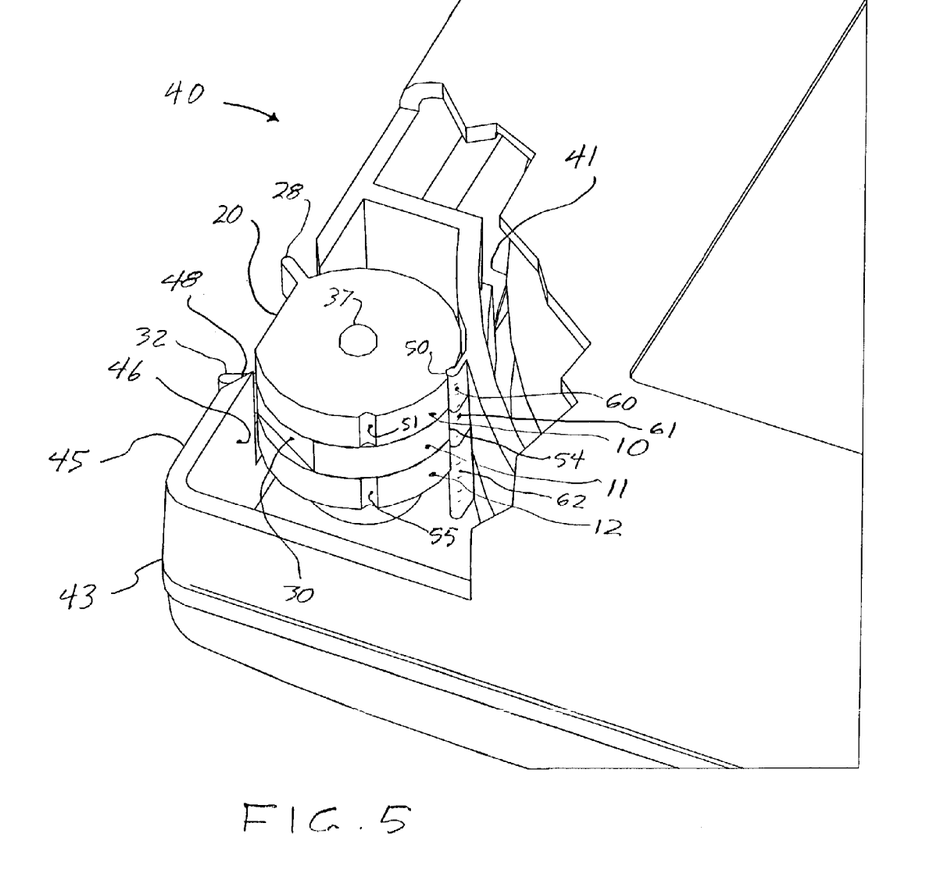
FIG. 5 is a partially cut away isometric illustration of the portable data storage cartridge of FIG. 3.

FIGS. 3, 4 and 5 illustrate the rotary devices of FIG. 2 positioned in a portable data storage cartridge 40 in accordance with one embodiment of the present invention. The example of a data storage cartridge comprises a magnetic tape cartridge having a leader block 42, which is attached to a magnetic tape wound inside the cartridge. Any suitable type of data storage cartridge may be employed to implement the present invention, including, but not limited to, a magnetic tape cartridge, a cartridge containing a magnetic disk drive, or a cartridge containing a solid state memory device, such as are discussed in the incorporated U.S. patent application Ser. No. 10/035,188. The magnetic tape cartridge illustrated in FIGS. 3, 4 and 5 may, for example, comprise an adaptation of the IBM 3590 magnetic tape cartridge.

The data storage cartridge 40 comprises a data storage medium, e.g., a reel 41 on which is wound a length of magnetic tape and a leader block 42 for unwinding the tape from the cartridge, and an enclosure 43 for the data storage medium, the enclosure having at least one exterior wall 45. A chamber 46 is provided within the enclosure, such that the chamber is closely adjacent the exterior wall 45 of the cartridge, with an opening 48 extending through the exterior wall to the chamber.

The rotary devices, e.g., rotary devices 10, 11 and 12 of FIG. 2, are positioned in the chamber 46 of FIGS. 3, 4 and 5, and each rotary device is arranged to be rotatable in the chamber of the cartridge. Each rotary device is separately rotatable such that, at differing rotational positions of the rotary device, at least one or none of the facets 20, 30, 33 is positioned at the exterior wall opening 48 of the portable data storage cartridge. Thus, at least one or none of the facets of the plurality of stacked rotary devices 10, 11 and 12 are positioned at the exterior wall opening 48 of the portable data storage cartridge. In the example of FIGS. 3, 4 and 5, facets 20 and 33, and cylindrical surface 31 of the stacked rotary devices 10, 11 and 12 are positioned at the exterior wall opening 48, and are sensible from the exterior of the cartridge, for example, by a data storage drive or transfer station.

The incorporated U.S. patent application Ser. No. 10/035,188 discusses apparatus for sensing facets and cylindrical surfaces of a single mechanical indicator, and similar apparatus may be employed to sense the facets and cylindrical surfaces of the stacked rotary devices of the present invention.

In the example of FIGS. 2, 3, 4 and 5, tab 28 of rotary device 10 may be moved from one side of opening 48 to the other to rotate rotary device 10 and alternatively expose cylindrical surface 18 or facet 20 at the opening. Tab 32 of rotary device 11 may be moved from one side of opening 48 to the other to separately rotate rotary device 11 and alternatively expose cylindrical surface 31 or facet 30 at the opening. Further, tab 35 of rotate rotary device 12 may be moved from one side of opening 48 to the other to separately rotate rotary device 12 and alternatively expose cylindrical surface 34 or facet 33 at the opening.

In a further embodiment of the present invention, the rotary devices additionally comprise at least one rotary device retaining element for interacting with at least one matching retaining element of the cartridge to retain the rotary device in at least one of the rotary positions. In the example of FIGS. 1, 2, 3, 4 and 5, the rotary device retaining elements comprise indentations 50, 51, 52, 53, 54, 55 substantially perpendicular to the central axis of rotation of the rotary device, such that a matching retaining element detent 60, 61, 62 of the cartridge, which extends from the chamber of the cartridge, and is located peripherally to the rotary device, may rest in the rotary device retaining element indentation, and retain the respective rotary device in a rotary position.

In one embodiment, pins or protrusions 37 of the rotary devices may engage corresponding holes or pivot points for rotation within the chamber 46 and about the central axis of rotation of the rotary device. In an alternative embodiment, the chamber 46 of the portable data storage cartridge is arranged to engage the peripheral surfaces of the right cylindrical sections of the rotary devices and fix the rotary devices in the radial direction for rotation within the chamber 46 and about the central axis of rotation 15 of the rotary device. Those of skill in the art may envision further alternative arrangements.

As the result, at least one or none of the facets or readable indicia of the plurality of stacked rotary devices are positioned at the exterior wall opening of the portable data storage cartridge, and represent various encoded patterns of facets and cylindrical surfaces, and the encoded representation of each separately rotatable rotary device is independent of the encoded representation of the adjacent rotary device.

As an example, the encoded representation may be represented in binary terms, with the cylindrical surface comprising a "1" and activating a switch, and a facet comprising a "0" and not activating a switch. Thus, the pattern represented by the separately rotatable rotary devices of the present invention may comprise any combination of 1's and 0's, ranging from "0—0—0" to "1—1—1", forming a multi-position mechanical indicator.

Figure 6:
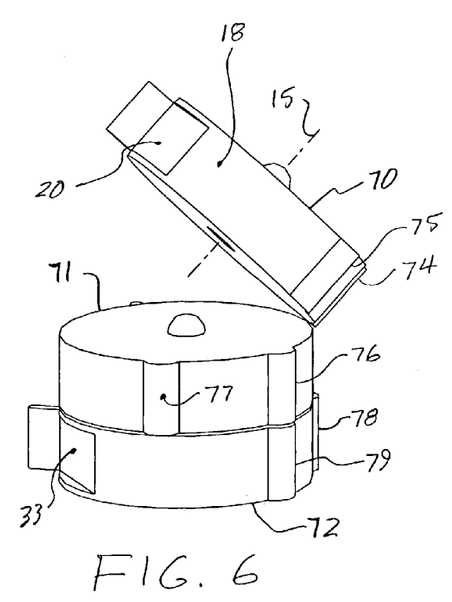
FIG. 6 is an isometric illustration of an alternative embodiment of three stackable rotary devices in accordance with the present invention.
Figure 7:
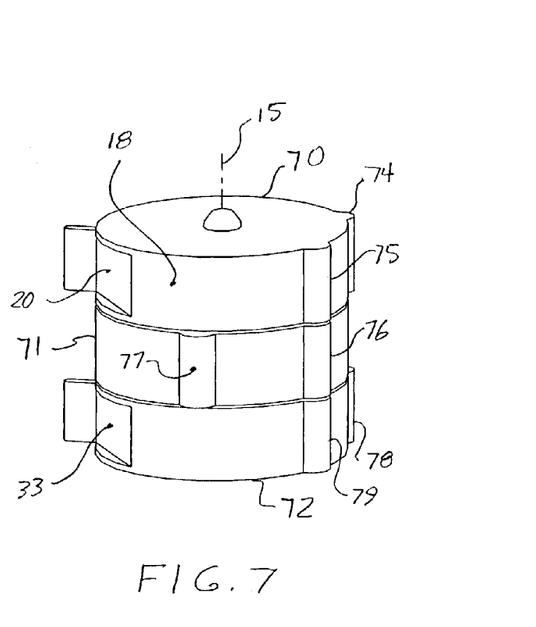
FIG. 7 is an isometric illustration of the rotary devices of FIG. 6, in a stacked arrangement.

FIGS. 6 and 7 illustrate an alternative embodiment of the present invention, in which the rotary device retaining elements of rotary devices 70, 71 and 72 comprise at least one detent 74, 75, 76, 77, 78, 79 extending from the rotary device peripheral surface substantially radially with respect to the central axis of rotation of the rotary device, e.g., axis 15, such that the detent may rest in at least one matching indentation in the chamber of the cartridge located peripherally to the rotary device. The rotary devices 70, 71 and 72 comprise similar facets, e.g., facets 20 and 33, as the rotary devices 10, 11 and 12, above. Thus, as the rotary devices are separately rotated to position desired facets or cylindrical surfaces at the opening of the cartridge, ones of the rotary device retaining element detents interact with at least one matching retaining element indentation of the cartridge to retain each of the rotary devices in the desired one of the rotary positions.

Figures 8, 9:
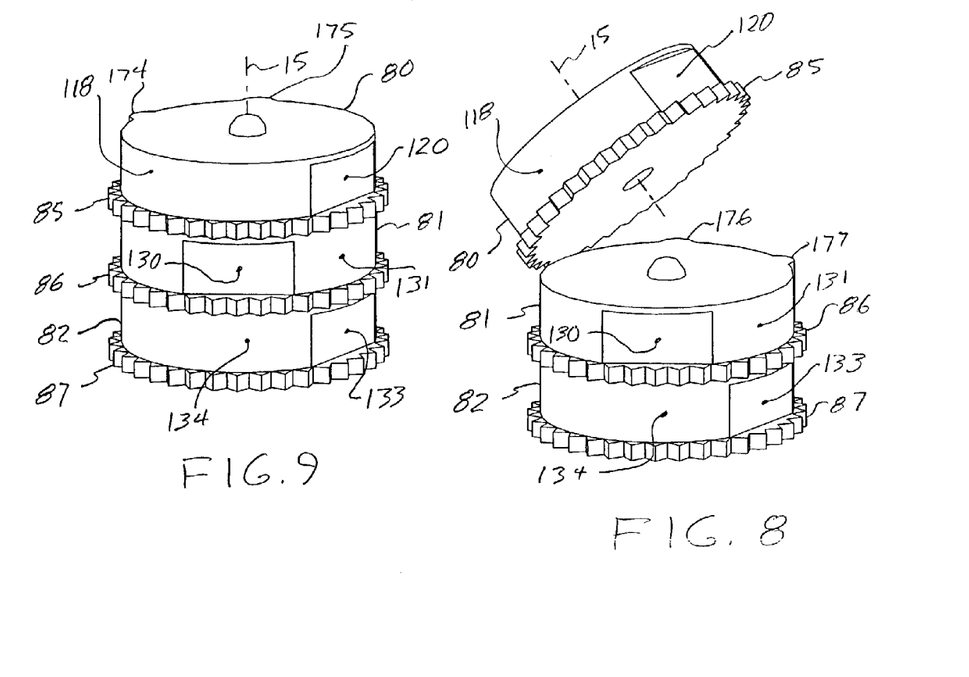
FIG. 8 is an isometric illustration of a further alternative embodiment of three stackable rotary devices in accordance with the present invention.
FIG. 9 is an isometric illustration of the rotary devices of FIG. 8, in a stacked arrangement.

FIGS. 8 and 9 illustrate a further alternative embodiment of the present invention, in which the rotary device 80, 81, 82 comprises a thumb wheel 85, 86, 87 for rotating the rotary device in the chamber of the cartridge and about the central axis of rotation 15 of the rotary device, the thumb wheel comprising a cylindrical section of larger diameter than the peripheral surface, e.g., cylindrical surface 118 of rotary device 80.

Figure 10:
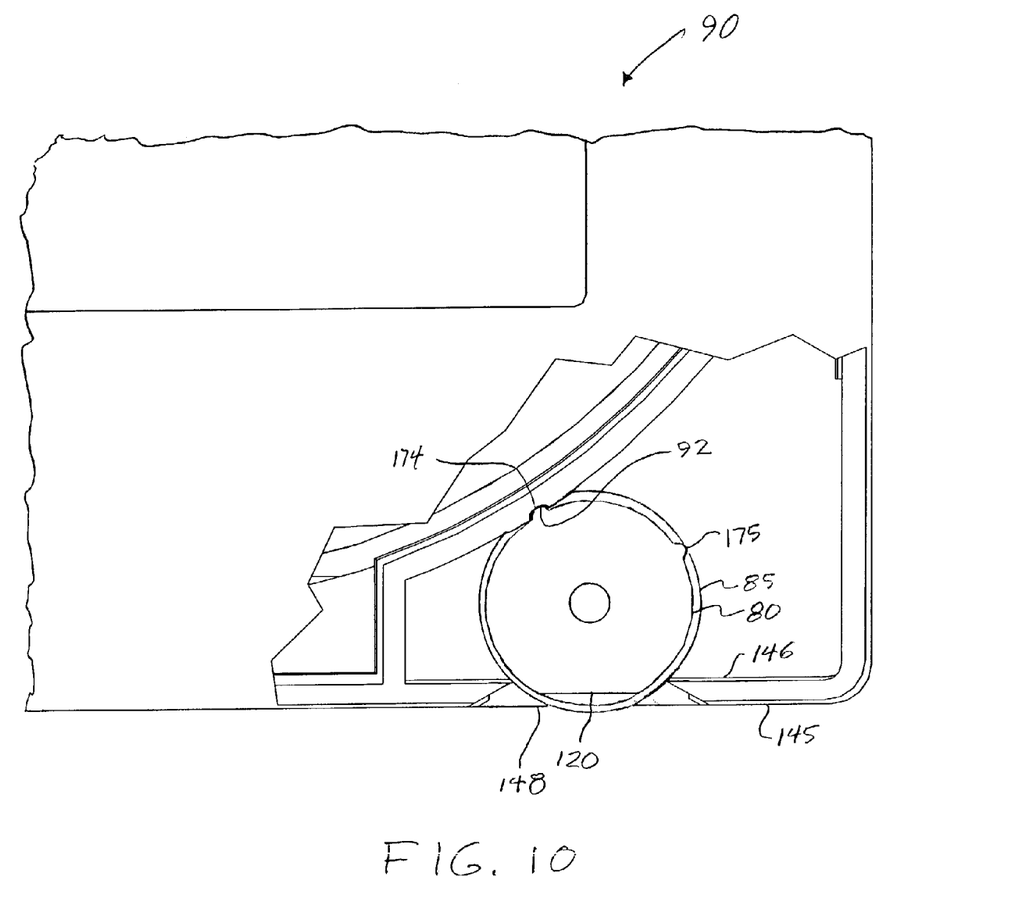
FIG. 10 is a partially cut away top view of the rotary devices of FIG. 9 positioned in a portable data storage cartridge in accordance with an alternative embodiment of the present invention.

Referring additionally to FIG. 10, a portable data storage cartridge 90 is illustrated. The rotary device retaining elements of rotary devices 80, 81 and 82 comprise at least one detent 174, 175, 176, 177 extending from the rotary device peripheral surface substantially radially with respect to the central axis of rotation of the rotary device, e.g., axis 15, such that the detent may rest in at least one matching retaining element indentation 92 in a chamber 146 of the cartridge located peripherally to the rotary device. The rotary devices 80, 81 and 82 comprise similar facets, e.g., facets 120, 130 and 133, and similar cylindrical surfaces 118, 131 and 134, as the rotary devices 10, 11 and 12, above. Thus, as the rotary devices are separately rotated by thumb wheels 85, 86, 87 to position desired facets or cylindrical surfaces at an opening 148 in a wall 145 of the cartridge 90, ones of the rotary device retaining element detents interact with the matching retaining element indentation 92 of the cartridge to retain each of the rotary devices in the desired one of the rotary positions.

Figures 11, 12:
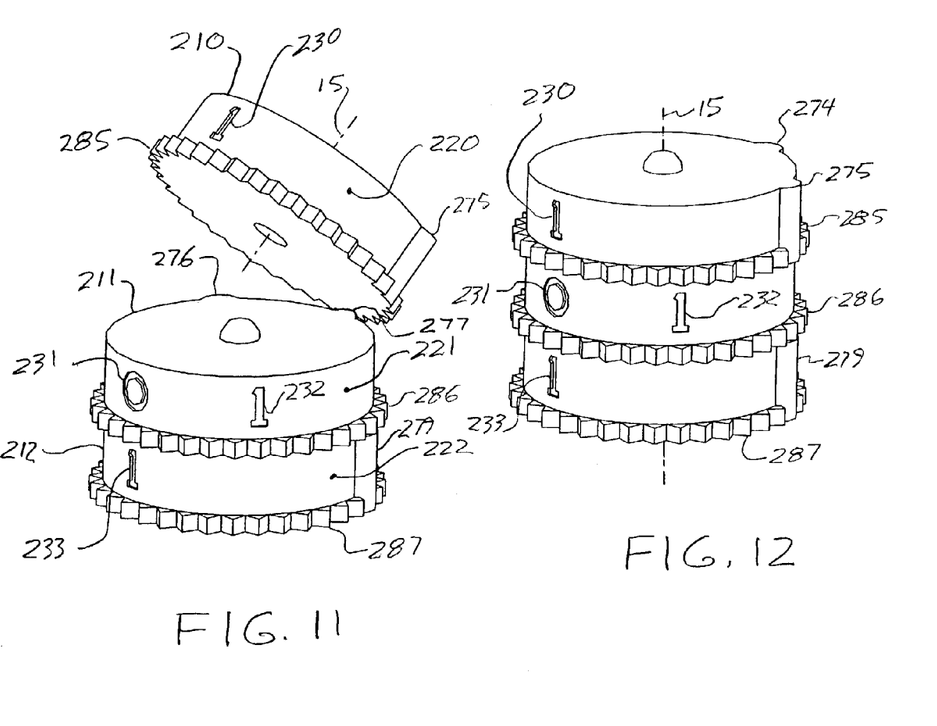
FIG. 11 is an isometric illustration of a still further alternative embodiment of three stackable rotary devices in accordance with the present invention.
FIG. 12 is an isometric illustration of the rotary devices of FIG. 11, in a stacked arrangement.

Referring to FIGS. 11 and 12, in another embodiment of the present invention, the rotary devices 210, 211, 212 each has a peripheral surface 220, 221, 222 of the right cylindrical section with an encoded pattern of readable indicia 230, 231, 232, 233 located at various angularly spaced rotational positions about the central axis of rotation 15. The readable indicia may be read by a user, or may be sensed optically by a data storage drive, as is understood by those of skill in the art Each rotary device 210, 211, 212 is separately rotatable such that, at differing rotational positions of the rotary device, at least one or none of the readable indicia 230, 231, 232, 233 is positioned at the exterior wall opening of the portable data storage cartridge, such that at least one or none of the readable indicia of the plurality of stacked rotary devices are positioned at the exterior wall opening of the portable data storage cartridge.

In the example of FIGS. 11 and 12, thumb wheels 285, 286, 287 are provided for rotating the rotary device in the chamber of the cartridge and about the central axis of rotation 15 of the rotary device, as discussed above. Also, rotary device retaining elements of rotary devices 210, 211 and 212 comprise detents 274, 275, 276, 277, 279 extending from the rotary device peripheral surface substantially radially with respect to the central axis of rotation of the rotary device, e.g., axis 15, such that the detent may rest in at least one matching retaining element indentation 92 in a chamber 146 of the cartridge located peripherally to the rotary device, also as discussed above.

Figure 13:
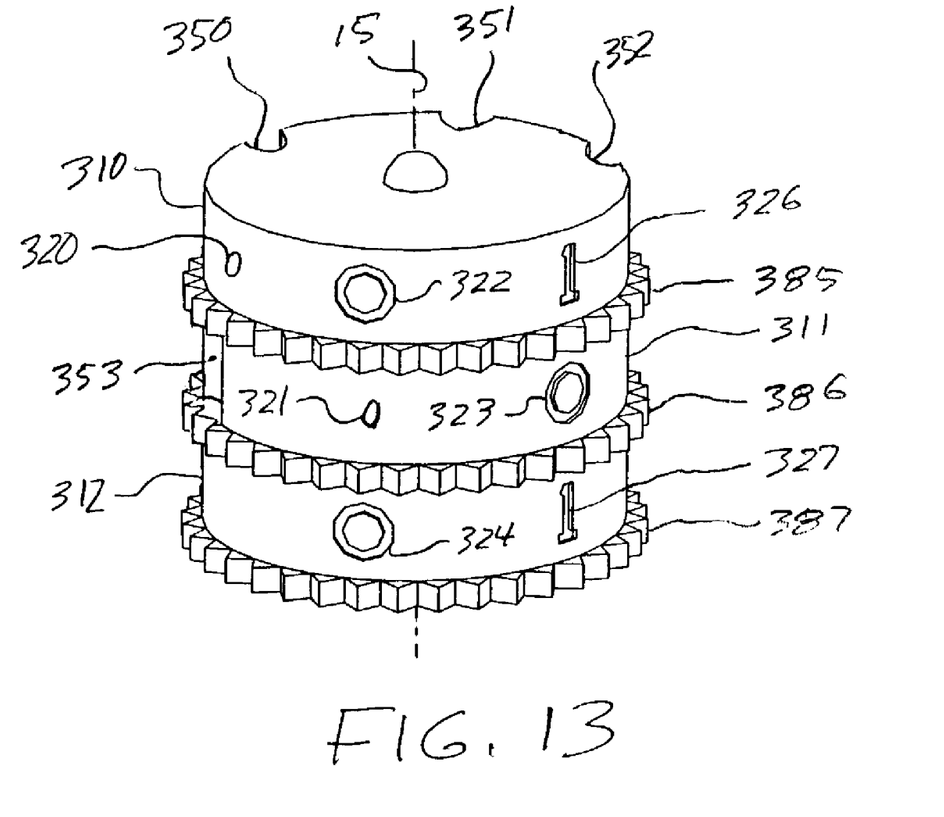
FIG. 13 is an isometric illustration of a still another alternative embodiment of three stackable rotary devices in accordance with the present invention.

Referring to FIG. 13, thumb wheels 385, 386, 387 of rotary devices 310, 311 and 312 are not limited in motion by the sides of the opening of the cartridge as are tabs. In accordance with another embodiment of the present invention, the readable indicia are not of the binary "0" or "1" type, but rather comprise readable indicia having additional values, and may additionally comprise an absence of any indicia. In the example of FIG. 13, readable indicia comprise a "dot" 320, 321, a "0" 322, 323, 324, and a "1" 326, 327.

A plurality of rotary device retaining elements, corresponding to the number of readable indicia, are provided, and comprise indentations 350, 351, 352, 353, which are substantially perpendicular to the central axis of rotation of the rotary device 15, such that a matching retaining element detent of the cartridge may rest in the rotary device retaining element indentation, and retain the respective rotary device in a rotary position. In accordance with another aspect of the present invention, one or more of the indentations may also comprise facets. In accordance with a further aspect of the present invention, analog readable indicia, such as a sloped line, may be employed, and the rotary device retaining elements determine the specific analog value of the readable indicia that is displayed at the cartridge opening at each stop.

While the preferred embodiments of the present invention have been illustrated in detail, it should be apparent that modifications and adaptations to those embodiments may occur to one skilled in the art without departing from the scope of the present invention as set forth in the following claims.

I claim:

1. A multi-position mechanical indicator configured to be positionable in a portable data storage cartridge; said portable data storage cartridge having a chamber therein, said chamber closely adjacent an exterior wall of said portable data storage cartridge; and said portable data storage cartridge having an opening extending through said exterior wall to said chamber; said indicator comprising:
a plurality of rotary devices stacked on one another; each said rotary device in the general form of at least one right cylindrical section having a central axis of rotation, and configured to be rotatable in said chamber of said portable data storage cartridge; and each said rotary device having a peripheral surface of said right cylindrical section with an encoded pattern of at least one cylindrical surface and of at least one facet interrupting said cylindrical surface, said at least one facet located at various angularly spaced rotational positions about said central axis of rotation; each said rotary device configured to be separately rotatable in said chamber of said portable data storage cartridge such that, at differing rotational positions of said rotary device, at least one or none of said at least one facet is configured to be positionable at said exterior wall opening of said portable data storage cartridge; whereby, at least one or none of said facets of said plurality of stacked rotary devices are positionable at said exterior wall opening of said portable data storage cartridge.

2. The multi-position mechanical indicator of claim 1, wherein each of said plurality of rotary devices additionally comprises a cylindrical section of larger diameter than said peripheral surface, comprising a thumb wheel for rotating said rotary device in said chamber of said cartridge.

3. The multi-position mechanical indicator of claim 1, wherein each of said plurality of rotary devices additionally comprises a tab extending from said cylindrical section, substantially radially with respect to said central axis of rotation of said rotary device, for rotating said rotary device in said chamber of said cartridge.

4. The multi-position mechanical indicator of claim 1, wherein each said facet of said encoded pattern of each of said plurality of rotary devices is parallel to said central axis of rotation of said rotary device.

5. The multi-position mechanical indicator of claim 1, wherein each of said plurality of rotary devices additionally comprises at least one rotary device retaining element for interacting with at least one matching retaining element of said cartridge to retain said rotary device in at least one of said rotary positions.

6. The multi-position mechanical indicator of claim 5, wherein said at least one rotary device retaining element comprises a detent extending from said rotary device peripheral surface substantially radially with respect to said central axis of rotation of said rotary device, such that said at least one rotary device retaining element detent may rest in said matching retaining element of said cartridge which comprises at least one indentation in said chamber of said cartridge located peripherally to said plurality of rotary devices.

7. The multi-position mechanical indicator of claim 5, wherein said rotary device retaining element comprises at least one indentation substantially perpendicular to said central axis of rotation of said rotary device, such that said matching retaining element of said cartridge may rest in said at least one rotary device retaining element indentation, said matching retaining element comprising at least one detent extending from said chamber of said cartridge located peripherally to said plurality of rotary devices.

8. A portable data storage cartridge, comprising:
at least a data storage medium;
an enclosure for said data storage medium, said enclosure having at least one exterior wall therein;
a chamber within said enclosure, said chamber closely adjacent said at least one exterior wall;
an opening extending through said exterior wall to said chamber; and
a plurality of rotary devices stacked on one another; each said rotary device in the general form of at least one right cylindrical section having a central axis of rotation, and arranged to be rotatable in said chamber; and each said rotary device having a peripheral surface of said right cylindrical section with an encoded pattern of at least one cylindrical surface and of at least one facet interrupting said cylindrical surface, said at least one facet located at various angularly spaced rotational positions about said central axis of rotation; said rotary devices positioned in said chamber, and each said rotary device separately rotatable within said chamber, such that, at differing rotational positions of said rotary device, at least one or none of said at least one facet is positioned at said exterior wall opening of said portable data storage cartridge; whereby, at least one or none of said facets of said plurality of stacked rotary devices are positioned at said exterior wall opening of said portable data storage cartridge.

9. The portable data storage cartridge of claim 8, wherein each of said plurality of rotary devices additionally comprises a cylindrical section of larger diameter than said peripheral surface, comprising a thumb wheel for rotating said rotary device in said chamber.

10. The portable data storage cartridge of claim 8, wherein each of said plurality of rotary devices additionally comprises a tab extending from said cylindrical section, substantially radially with respect to said central axis of rotation of said rotary device, for rotating said rotary device in said chamber.

11. The portable data storage cartridge of claim 8, wherein each said facet of said encoded pattern of each of said plurality of rotary devices is parallel to said central axis of rotation of said rotary device.

12. The portable data storage cartridge of claim 8, wherein each of said plurality of rotary devices additionally comprises at least one rotary device retaining element; and said chamber additionally comprises at least one matching retaining element, such that said at least one rotary device retaining element interacts with said matching retaining element to retain said rotary device in at least one of said rotary positions.

13. The portable data storage cartridge of claim 12, wherein said at least one rotary device retaining element comprises a detent extending from said rotary device peripheral surface substantially radially with respect to said central axis of rotation of said rotary device; and said matching retaining element of said chamber comprises at least one indentation in said chamber located peripherally to said plurality of rotary devices, such that said at least one rotary device retaining element detent may rest in said matching retaining element indentation of said chamber.

14. The portable data storage cartridge of claim 12, wherein said rotary device retaining element comprises at least one indentation substantially perpendicular to said central axis of rotation of said rotary device; and, said matching retaining element comprises at least one detent extending from said chamber located peripherally to said plurality of rotary devices, such that said matching retaining element detent may rest in said at least one rotary device retaining element indentation.

* * * * *